April 12, 1949.  E. P. MILLER  2,466,906
METHOD AND APPARATUS FOR FORMING FIBROUS WEBS
Filed Nov. 23, 1946  2 Sheets-Sheet 1

INVENTOR.
EMERY P. MILLER
BY Harry E. Downer
George A. Ordway

INVENTOR.
EMERY P. MILLER

Patented Apr. 12, 1949

2,466,906

UNITED STATES PATENT OFFICE 2,466,906

METHOD AND APPARATUS FOR FORMING FIBROUS WEBS

Emery P. Miller, Williams Creek, Ind., assignor, by mesne assignments, to Ransburg Electro-Coating Corp., Indianapolis, Ind., a corporation of Indiana Application November 23, 1946, Serial No. 711,941

13 Claims. (Cl. 154—1)

This invention relates to a method and apparatus for manufacturing fibrous matting or webs and more particularly to such novel method and apparatus which utilize electrostatic forces.

Heretofore, in the production of fibrous matting, it has been a practice to blow a stream of binding material and a stream of elongated fibrous material into a chamber through which passes a suitable endless conveyor. The two streams intermingle in the chamber and the fibrous particles receive a coating of the binding material, and most of these coated fibrous particles settle under the action of the force of gravity on the endless conveyor in the form of a matting or web and thereafter the matting or web is carried from the chamber. However, during the mixing process and the ensuing gravitational settling, the particles float freely about the inside of the chamber. During this time some of the coated fibrous particles and some of the binding particles have a tendency to adhere to the walls of the chamber and build up, grow together or tree until, under their weight, they break loose and fall in a cluster on the conveyor. This causes imperfections in the desired homogeneous texture of the matting and also the desired uniformity in the depth of thickness of the matting. It also results in a waste of some of the ingredients used.

It is an object, therefore, of the present invention to provide methods and apparatus for the efficient and economical manufacture of matting.

It is a further object of the present invention to manufacture matting of an improved, uniform quality.

It is a further object of the present invention to provide apparatus for manufacturing matting where the introduced material is quickly applied to the collecting belt after mixing so that the random settling under the action of gravity is avoided and wall collection is reduced to a minimum.

It is a further object of the present invention to provide methods and apparatus for manufacturing matting, which economize in the use of space and at the same time increase production.

It is a further object of the present invention to provide methods and apparatus in which the ingredients for the matting are mixed more throroughly and more efficiently.

In accordance with the present invention, at least two different ingredients are introduced into a zone which may be referred to as a mixing zone and which zone is located at the entrance end of an enclosure which also surrounds the settling zone in which the mixed materials are formed into the desired matting or web. This enclosure is insulated from ground and made of an electrically conducting material. Of the ingredients introduced, one may be any vegetable, animal, mineral or synthetic fibrous material and the other ingredient may be any suitable binding material of a sticky, adhesive, glutinous, tacky character. Both ingredients are introduced into the mixing zone preferably in gas streams from suitable issuing means. The fiber particle-issuing means may be one or more suitable blowers and the binding particle-issuing means may be one or more spray guns.

The mixing of the particles of the two ingredients may be obtained solely by permitting such particles to contact each other in the mixing zone as a result of the force imparted to them by the gas streams or mixing may be effected electrostatically. One way of obtaining electrostatic mixing is shown in Patent No. 2,270,341 of Harold P. Ransburg. Electrostatic mixing may also be achieved by introducing the particles of the different ingredients into a mixing zone surrounded by walls which are maintained at a substantial electrical potential. Like charges of one polarity are imparted to the particles of one ingredient and like charges of another polarity are imparted to the particles of another ingredient. In this discussion it will be assumed that the different charges on the particles are positive and negative and the polarity of the potential imparted to the walls of the mixing zone is negative. The different particles are charged by surrounding the discharge ends of the issuing means with an ionized atmosphere. This is done by placing fine wires or points of conducting material around the discharge ends of the issuing means and properly connecting these wires or points to a source of high voltage. Some examples of such arrangements are shown in Patent No. 2,221,338 of Harry A. Wintermute.

The positively and negatively charged particles are introduced into the mixing zone in such a manner that the negatively charged particles are intermediate the positively charged particles and the walls. This arrangement results in more complete, thorough and uniform mixing since mixing is promoted not only by the force of the gas streams and by the opposite charges on the particles of the two different ingredients but also by the arrangement of the different issuing means in relation to the walls of the mixing zone.

During the mixing or coating process, the charges on the particles tend to become neutralized. Thereafter the mixed or coated particles are moved into a settling zone by the combined gas streams where the mixed or coated particles are subjected to an electric field which charges and deposits them on a belt in the form of matting or a web. The matting or web builds up its thickness progressively as it moves through the settling zone. Preferably the electric field is created between a collecting electrode and a depositing electrode spaced from each other and electrically connected to a suitable high voltage source. The collecting electrode may be in the form of a continuous metal mesh belt and preferably is pitched upwardly at an angle to the horizontal. The depositing electrode comprises a series of fine wires or points arranged in substantially one plane. The depositing electrode is spaced from the collecting electrode so that the edge of the depositing electrode nearest the mixing zone is farther from the collecting electrode than its opposite edge. The purpose of this spacing is to reduce to a minimum the collection of particles on the depositing electrode prior to their becoming charged and repelled by it. It also permits efficient deposition of the particles over a greater effective area since the electrostatic depositing force increases in the direction of movement of the particles.

The improved electrostatic method and apparatus increases the efficiency in forming the matting. This is so because the forces that exist in the settling zone all act to force the particles toward the belt—the force of gravity and the forces resulting from the electric field that exists between the depositing electrode and the belt and also between the walls surrounding the settling zone and the belt. The result is that less ingredient material is required for forming matting, the collection of particles on the walls surrounding the settling zone is reduced to a minimum and a shorter booth may be utilized.

After the web or matting has been formed on the collecting electrode, it is moved out of the settling zone for any further treatment desired and subsequent removal from the belt.

For a better understanding of the invention, together with other and further objects thereof, reference is had to the following specification taken in connection with the accompanying drawing, and its scope will be pointed out in the appended claims.

In the accompanying drawing.

Figure 1:
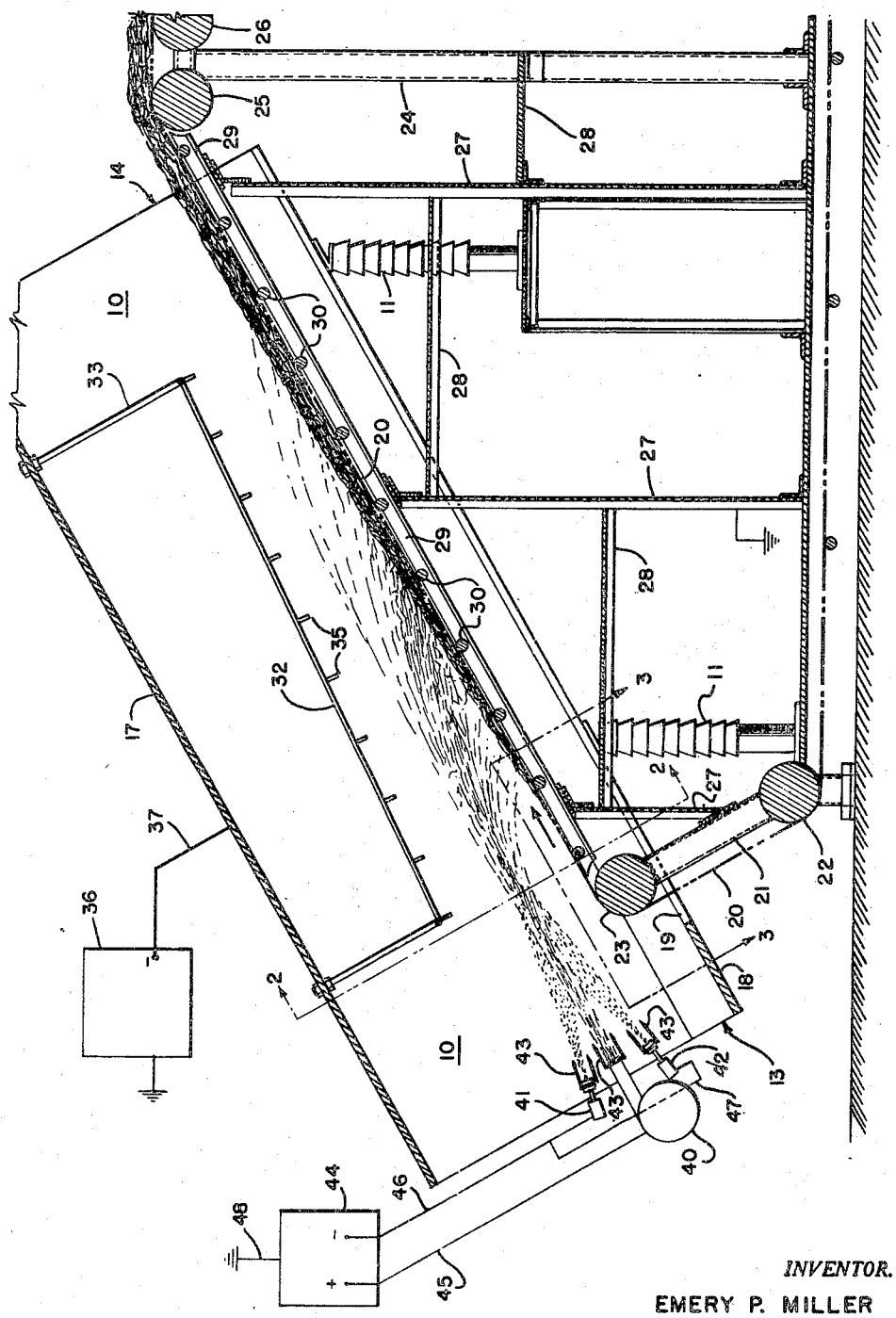
Figure 1 is a side elevation view of the apparatus.
Figure 2:
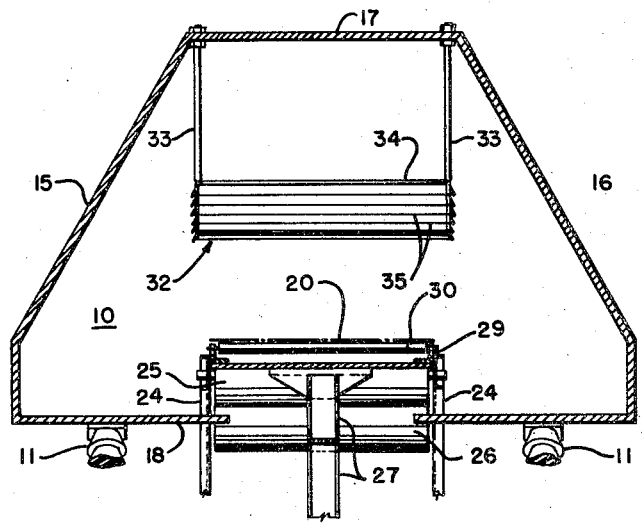
Figure 2 is an end view taken along line 2—2 of the apparatus shown in Figure 1.
Figure 3:
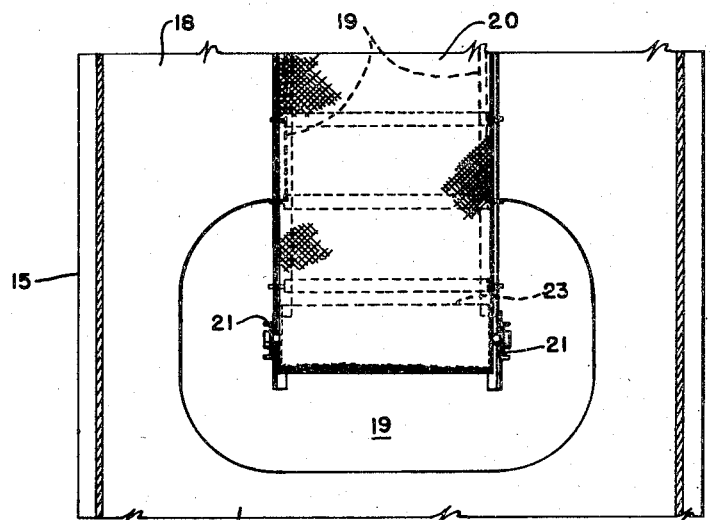
Figure 3 is a top view taken along line 3—3 of the apparatus shown in Figure 1.

Referring now particularly to Figure 1, there is shown a booth 10 supported on a plurality of insulators 11. The booth 10 is supported in such a manner that its longitudinal axis is at an acute angle to the horizontal. The booth comprises an open entrance 13, an open exit 14, side walls 15 and 16, ceiling 17 and floor 18. The side walls 15 and 16 are preferably built so that they slant outwardly at an angle as shown in Figure 2. The floor 18 is provided with an opening 19 which extends centrally and longitudinally thereof. Extending through the floor opening 19 there is provided a supporting structure for a belt 20.

This supporting structure comprises a front pulley support 21 provided with pulleys 22 and 23, a rear pulley support 24 provided with pulleys 25 and 26, and an intermediate structure which includes a plurality of vertical beams 27, a plurality of horizontal beams 28, a longitudinally extending U-shaped member 29 mounted on the vertical members 27 and a plurality of rollers 30 which are journaled in the U-shaped member 29. The front pulley support 21 is located so that its upper pulley 23 extends above the booth floor 18 and is positioned intermediate the entrance and exit ends of the booth 10. The rear pulley support 24 is located outside of the booth 10 and beyond its exit end, and its upper pulley 25 is positioned to maintain the belt 20 above the booth floor 18. The belt 20 is of the continuous type and is made of conducting material, preferably of metal mesh so that it may serve as one electrode of an electric field. The belt is movably mounted to travel over the pulleys 22, 23, rollers 30 and pulleys 25, 26 in the direction of the arrow shown in Figure 1. The movement of the belt is achieved by connecting a driving mechanism (not shown) to one of the pulleys. Since the belt and the various members of the belt supporting structure are maintained at ground potential, they must be spaced at a sufficient distance from other parts of the apparatus that are maintained at a different electrical potential to prevent sparkover.

A depositing electrode, generally indicated at 32 comprising a rectangular frame 34 and a series of fine wires 35 stretched at equal intervals across the frame transversely of its length, is supported from the ceiling 17 by rods 33. The front edge of the electrode 32 is spaced farther from the belt 20 than its rear edge. The electrode 32 as well as the booth 10 are connected to the negative terminal of a source of high voltage 36 by a conductor 37.

Just outside the entrance 13 there are positioned a plurality of issuing means which in the drawing include a blower 40 and a pair of spray guns 41 and 42. Preferably, the blower is positioned centrally of the entrance 13 and the spray guns are positioned above and below the blower. The discharge ends of both the blower 40 and the spray guns 41 and 42 are surrounded by fine points or wires 43 for creating in these areas an ionized atmosphere. The blower is electrically connected to the positive terminal of a source of high voltage 44 by a conductor 45. The spray guns 41 and 42 are connected to the negative terminal of the same voltage source 44 by conductors 46 and 47. Voltage source 44 is connected at its midpoint to ground by conductor 48.

The blower is connected to a source (not shown) of suitable fibrous material, for example, wood fibers, and is positioned to direct this material into the booth 10 in a stream substantially parallel to the belt 20. Each spray gun 41 and 42 is connected to a source (not shown) of suitable binding material, for example, a resin binder solution. The gun 42 is positioned to direct a spray of the binding material upwardly and toward the stream of fibrous material, and gun 41 is positioned to direct a spray of binding material downwardly and toward the stream of fibrous material.

Considering the operation of the apparatus described, positively charged fibrous particles are discharged into the booth 10 centrally of its entrance and substantially parallel to its longitudinal axis. Simultaneously with the introduction of fibrous particles, spray guns 41 and 42 discharge separate sprays of negatively charged binding particles into the booth 10 toward the stream of fibrous particles. The part of the booth 10 into which the fibrous and binding particles are introduced is referred to as a mixing zone. These particles become intimately and thoroughly mixed in the mixing zone. The forces that combine to obtain this mixing are (1) the force imparted to the particles by the gas streams, (2) the attractive electrostatic force between the differently charged particles and (3) the repelling electrostatic force between the walls of the booth and the negatively charged particles.

The mixing process tends to neutralize the charges on the particles before they leave the mixing zone. After the mixing process the force of the united gas streams carries the neutralized mixed particles into the electric field between the belt 20 and the depositing electrode 32 which is referred to as a settling zone. This electric field in the settling zone has corona discharge characteristics and charges the mixed particles as they come under its influence. Thereafter the force of this electric field and the component of the force of gravity perpendicular to the belt combine to propel the mixed particles onto the belt 20. That component of the gravitational force which is parallel to the belt tends to retard the velocity which the air streams impart to the particles and hence renders them more susceptible to the action of the field. This combination of depositing forces results in an improved, uniform, intimately mixed web or matting which is obtained with greater efficiency and economy. By electrostatically controlling the particles in both the mixing zone and the settling zone, the problem of random particles accumulating on the walls of the booth is reduced to a minimum. If any random particles should collect on the walls, their slanting construction does not permit the clustered particles to drop on the web or matting formed on the belt 20 but they harmlessly fall on the floor 18. Thereafter the belt carries this improved matting out of the booth 10 through its exit end. The web may thereafter be given further treatment before use such, for example, as pressing and drying.

While the present invention is, of course, not restricted to any particular design, highly satisfactory results may be obtained by using the design data listed below in connection with the embodiment described in this specification:

| | |
|---|---|
| Electrode 43 of blower 40 | + 50,000 volts D. C. |
| Electrodes 43 of spray guns 41 and 42 | — 50,000 volts D. C. |
| Walls of booth 10 | —100,000 volts D. C. |
| Depositing electrode 32 | —100,000 volts D. C. |
| Belt 20 | Ground potential |
| Spacing between front edge of electrode 32 and belt 20 | 23 inches |
| Spacing between rear edge of electrode 32 and belt 20 | 17 inches |
| Length of depositing electrode 32 | 9 feet |

By this invention superior mixing of the ingredient materials is obtained from which a web of improved uniformity may be manufactured efficiently and economically. It will thus be seen that there has been provided by this invention a method and apparatus in which the various objects hereinbefore set forth together with many thoroughly practical advantages are successfully achieved.

As various possible embodiments might be made of the mechanical and electrical features of the above invention and as the art herein described might be varied in various parts all without departing from the scope of the invention, it is to be understood that all matter hereinbefore set forth or shown in the accompanying drawing is to be interpreted as illustrative and not in a limiting sense.

I claim:

1. Apparatus for manufacturing matting comprising a mixing chamber, a settling chamber, a plurality of issuing means for propelling particles of two different ingredients of the matting successively through said mixing chamber and into said settling chamber, ionizing means associated with said issuing means for charging said particles, the charge imparted to the particles of one ingredient having a polarity of an opposite sense from the charge imparted to the particles of the other ingredient whereby the particles of one ingredient are attracted to and mixed with the particles of the other ingredient in said mixing chamber, a collecting electrode movable through said settling chamber, a depositing electrode spaced from said collecting electrode, a high voltage source electrically connected to said electrodes for creating an electrostatic field therebetween for depositing said mixed particles onto said collecting electrode after their entry into said settling chamber.

2. In apparatus for manufacturing matting comprising a plurality of issuing means for propelling particles of two different ingredients of the matting successively through a mixing zone and into a settling zone, a high voltage source, ionizing means associated with said issuing means and electrically connected to said high voltage source for charging the particles of one of said ingredients to like charges of one polarity and the particles of the other ingredient to like charges of an opposite polarity whereby the particles with different charges are attracted to each other and mixed in the mixing zone, a collecting electrode movable through said settling zone, and a depositing electrode spaced from said collecting electrode, said voltage source also being electrically connected to said depositing and collecting electrodes for creating an electrostatic field therebetween for depositing said mixed particles onto said collecting electrode after their entry into said settling zone and said depositing electrode being at a substantially greater potential than said ionizing means.

3. Apparatus for manufacturing matting comprising a movable collecting electrode, a depositing electrode spaced from said collecting electrode, a high voltage source electrically connected to said electrodes for creating an electrostatic field between said electrodes, means for electrostatically mixing particles of two different ingredients of the matting, said means imparting sufficient energy to said particles whereby they move, after their mixture, into said electric field for deposition on said collecting electrode.

4. The invention set forth in claim 3 with the addition that the edge of said depositing electrode nearest said mixing means is spaced at a greater distance from said collecting electrode than its opposite edge.

5. The invention set forth in claim 3 with the addition that said apparatus is arranged so that the precipitating force of said electrostatic field and the force of gravity make respectively an angle of ninety degrees and an angle greater than ninety degrees with the direction of movement of the mixed particles as they enter said field.

6. In the method of manufacturing matting, the improvement which consists of electrostatically mixing fibrous particles and binding particles and thereafter subjecting said mixed particles to an electrostatic field for forming said particles into a matting.

7. In the method of manufacturing matting, the improvement which consists of electrostatically coating fibrous particles with binding particles and thereafter subjecting the said coated particles to an electrostatic field having ionizing characteristics for forming said particles into a matting by depositing them on a support.

8. The method of manufacturing matting which comprises imparting like electrical charges to the individual particles of one ingredient of the matting, imparting to particles of a second ingredient of the matting like charges of a polarity opposite to that of the charges on the particles of said first ingredient, mixing said charged particles in a common zone and presenting said mixed particles to an electrostatic field for forming said particles into a matting.

9. The invention set forth in claim 8 with the addition that one of said ingredients comprises wood fiber particles and the other comprises a resin binder solution.

10. The method of manufacturing matting which comprises imparting like electrical charges to the individual particles of one ingredient of the matting, imparting to particles of a second ingredient of the matting like charges of a polarity opposite to that of the charges on the particles of said first ingredient, imparting energy to said particles for moving them through first and second zones, said particles being electrostatically mixed in said first zone, and creating an ionized atmosphere in said second zone for depositing said mixed particles upon a support in the form of a matting.

11. A method of manufacturing matting which comprises mixing particles of two different ingredients by directing streams thereof toward each other in a mixing zone and presenting said mixed particles to an electrostatic field for forming said particles into a matting.

12. In the method of electrostatic depositing of particled adhesive material upon a base in a depositing zone, the improvement which consists in establishing an electrostatic field in the depositing zone, said field having an extended region in which field-intensity progressively increases, and introducing said material in a gas stream into said field region from the end thereof where the forces are the weakest.

13. Apparatus for manufacturing matting comprising a collecting electrode, a depositing electrode spaced from said collecting electrode, a high voltage source electrically connected to said electrodes for creating an electrostatic field therebetween, means for electrostatically mixing particles of two different ingredients for a matting, means for imparting sufficient energy to said particles for moving them, after their mixture, into said electrostatic field, and means for collecting the mixed particles in said field in the form of a mat.

EMERY P. MILLER.

REFERENCES CITED

The following references are of record in the file of this patent:

UNITED STATES PATENTS

| Number | Name | Date |
|---|---|---|
| 1,964,668 | Lofman | June 26, 1934 |
| 2,086,757 | Williams | July 13, 1937 |
| 2,152,077 | Meston | Mar. 28, 1939 |
| 2,173,032 | Wintermute | Sept. 12, 1939 |
| 2,189,840 | Simison et al. | Feb. 13, 1940 |
| 2,217,444 | Hill | Oct. 8, 1940 |
| 2,270,341 | Ransburg | Jan. 20, 1942 |
| 2,334,648 | Ransburg | Nov. 16, 1943 |
| 2,363,480 | Brownlee | Nov. 28, 1944 |
| 2,385,873 | Melton | Oct. 2, 1945 |